United States Patent
Jackson, II

(10) Patent No.: US 6,564,497 B2
(45) Date of Patent: May 20, 2003

(54) FISHING LURE WITH RELAY CREATING IRREGULAR ELECTRIC SIGNALS

(75) Inventor: Freddie E. Jackson, II, Flower Mound, TX (US)

(73) Assignee: Jackson & Jackson Electronic All Star Lures, Inc., Flower Mound, TX (US)

( * ) Notice: Subject to any disclaimer, the term of this patent is extended or adjusted under 35 U.S.C. 154(b) by 0 days.

(21) Appl. No.: 09/894,178

(22) Filed: Jun. 28, 2001

(65) Prior Publication Data

US 2002/0050091 A1 May 2, 2002

Related U.S. Application Data

(63) Continuation-in-part of application No. 09/500,939, filed on Feb. 15, 2000, now abandoned.

(51) Int. Cl.[7] ................................................. A01K 79/02
(52) U.S. Cl. ......................................................... 43/17.1
(58) Field of Search ........................................... 43/17.1

(56) References Cited

U.S. PATENT DOCUMENTS

| | | | | |
|---|---|---|---|---|
| 2,745,205 A | * | 5/1956 | Kafka | 307/107 |
| 3,043,041 A | * | 7/1962 | Kreutzer | 43/17.1 |
| 3,058,252 A | * | 10/1962 | Matusche | 43/17.1 |
| 3,310,902 A | * | 3/1967 | Godby | 43/17 |
| 3,363,354 A | * | 1/1968 | Riemer | 43/17.1 |
| 3,414,873 A | * | 12/1968 | Richard et al. | 367/139 |
| 3,416,254 A | * | 12/1968 | Bornzin | 43/17.1 |
| 4,583,313 A | * | 4/1986 | Dugan, Jr. | 43/17.1 |
| 4,805,339 A | * | 2/1989 | Fuentes et al. | 43/17.1 |
| 5,046,278 A | * | 9/1991 | Szilagyi et al. | 43/17.1 |
| 5,148,622 A | * | 9/1992 | Blair | 43/17.1 |
| 5,177,891 A | * | 1/1993 | Holt | 43/17.1 |
| 5,331,760 A | * | 7/1994 | DuMont | 43/17.1 |
| 5,485,697 A | * | 1/1996 | Watson et al. | 43/17.1 |
| 5,697,182 A | * | 12/1997 | Rodgers | 43/17.1 |
| 6,047,492 A | * | 4/2000 | Watson et al. | 43/17.1 |
| 6,192,617 B1 | * | 2/2001 | Lyles | 43/17.1 |

* cited by examiner

Primary Examiner—Charles T. Jordan
Assistant Examiner—Jordan M Lofdahl
(74) Attorney, Agent, or Firm—Michael L. Diaz

(57) ABSTRACT

A fishing lure creating irregular fish-attracting signals to attract fish to the fishing lure. The fishing lure includes circuitry located within an interior chamber of the fishing lure. The circuitry includes a timer for periodically sending electrical signals to a relay having a magnetic coil. The coil converts the electric signals into signals attractive to fish, such as sound or light signals. The coil receives voltage at a gradually decreasing rate which allows the fishing lure to create irregular signals to the fish.

12 Claims, 9 Drawing Sheets

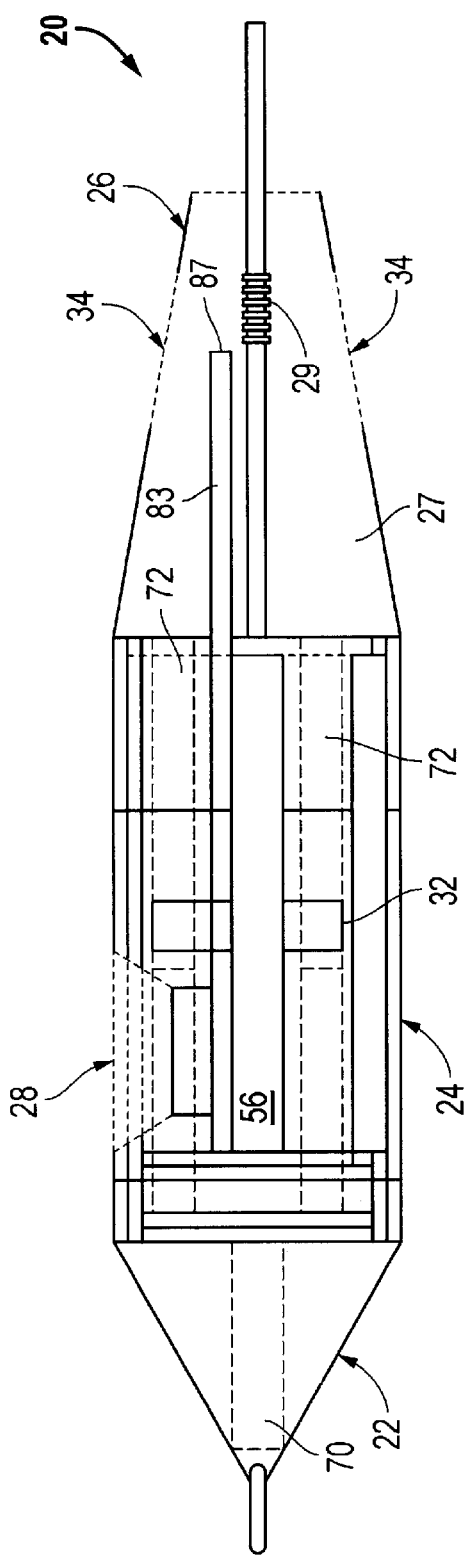
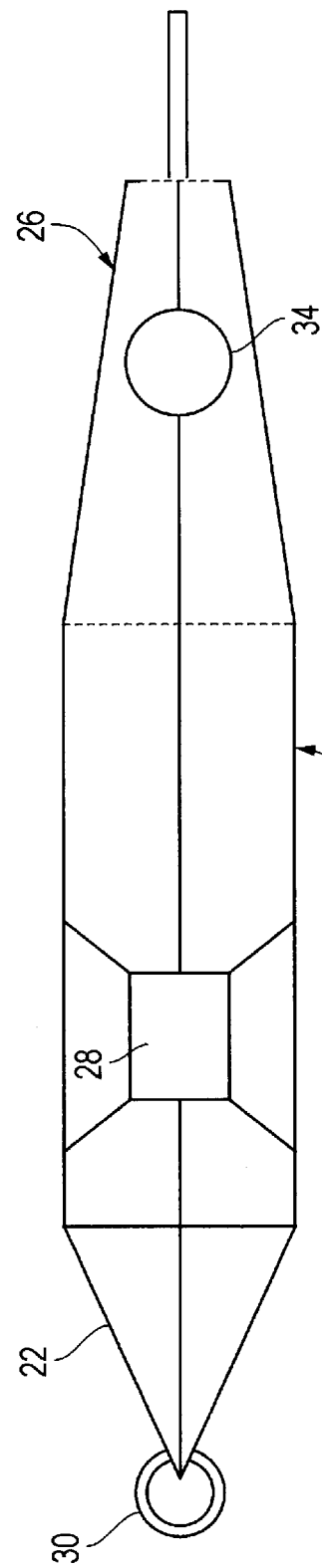
FIG. 1
FIG. 2

| A | B | C | D | E | F |
|---|---|---|---|---|---|
| Voltage Applied by Battery (Vcc) (volts) | Voltage used to turn Transistor On (volts) | Resistance of the Relay's Coil (ohms) | Amplified Current Applied to Relay's Coil (milliAmps) | Positive pulse (t1) (seconds) | Negative Pulse (t2) (seconds) |
| 12 v | 0.707 v | 45 ohms | 250 mA | 16.63 s | 2.77 s |
| 11.5 v | 0.707 v | 45 ohms | 240 mA | 16.63 s | 2.77 s |
| 11.0 v | 0.707 v | 45 ohms | 229 mA | 16.63 s | 2.77 s |
| 10.5 v | 0.707 v | 45 ohms | 218 mA | 16.63 s | 2.77 s |
| 10.0 v | 0.707 v | 45 ohms | 207 mA | 16.63 s | 2.77 s |
| 9.5 v | 0.707 v | 45 ohms | 195 mA | 16.63 s | 2.77 s |
| 9.0 v | 0.707 v | 45 ohms | 184 mA | 16.63 s | 2.77 s |
| 8.5 v | 0.707 v | 45 ohms | 173 mA | 16.63 s | 2.77 s |
| 8.0 v | 0.707 v | 45 ohms | 162 mA | 16.63 s | 2.77 s |
| 7.5 v | 0.707 v | 45 ohms | 151 mA | 16.63 s | 2.77 s |
| 7.0 v | 0.707 v | 45 ohms | 140 mA | 16.63 s | 2.77 s |
| 6.5 v | 0.707 v | 45 ohms | 129 mA | 16.63 s | 2.77 s |
| 6.0 v | 0.707 v | 45 ohms | 118 mA | 16.63 s | 2.77 s |
| 5.5 v | 0.707 v | 45 ohms | 107 mA | 16.63 s | 2.77 s |
| 5.0 v | 0.707 v | 45 ohms | 95 mA | 16.63 s | 2.77 s |
| 4.5 v | 0.707 v | 45 ohms | 84 mA | 16.63 s | 2.77 s |
| 4.0 v | 0.707 v | 45 ohms | 73 mA | 16.63 s | 2.77 s |
| 3.5 v | 0.707 v | 45 ohms | 62 mA | 16.63 s | 2.77 s |
| 3.0 v | 0.707 v | 45 ohms | 51 mA | 16.63 s | 2.77 s |
| 2.5 v | 0.707 v | 45 ohms | 40 mA | 16.63 s | 2.77 s |
| 2.0 v | 0.707 v | 45 ohms | 29 mA | 16.63 s | 2.77 s |
| 1.5 v | 0.707 v | 45 ohms | 18 mA | 16.63 s | 2.77 s |

*FIG. 7A*

| G | H | I | J | K | L |
|---|---|---|---|---|---|
| Complete Duty cycle (percentage) | Frequency of Timer (Hertz) | Duration in time contact remain in each zone t(t1+t2) | Frequency of Relay in each Zone | Zone Representation | Pitch of Relay |
| 0.857 per | 0.515 hertz | 2(t1+t2)=38.8 sec | 1/(t1a+t2a) | Zone 1 | Pitch 1 |
| 0.857 per | 0.515 hertz | 4(t1+t2)=77.6 sec | 1/(t1b+t2b) | Zone 2 | Pitch 2 |
| 0.857 per | 0.515 hertz | 6(t1+t2)=116.4 sec | 1/(t1c+t2c) | Zone 3 | Pitch 3 |
| 0.857 per | 0.515 hertz | 8(t1+t2)=155.2 sec | 1/(t1d+t2d) | Zone 4 | Pitch 4 |
| 0.857 per | 0.515 hertz | 10(t1+t2)=194 sec | 1/(t1e+t2e) | Zone 5 | Pitch 5 |
| 0.857 per | 0.515 hertz | 12(t1+t2)=232.8 sec | 1/(t1f+t2f) | Zone 6 | Pitch 6 |
| 0.857 per | 0.515 hertz | 14(t1+t2)=271.6 sec | 1/(t1g+t2g) | Zone 7 | Pitch 7 |
| 0.857 per | 0.515 hertz | 16(t1+t2)=310.4 sec | 1/(t1h+t2h) | Zone 8 | Pitch 8 |
| 0.857 per | 0.515 hertz | 18(t1+t2)=349.2 sec | 1/(t1i+t2i) | Zone 9 | Pitch 9 |
| 0.857 per | 0.515 hertz | 20(t1+t2)=388 sec | 1/(t1j+t2j) | Zone 10 | Pitch 10 |
| 0.857 per | 0.515 hertz | 22(t1+t2)=426.8 sec | 1/(t1k+t2k) | Zone 11 | Pitch 11 |
| 0.857 per | 0.515 hertz | 24(t1+t2)=465.6 sec | 1/(t1l+t2l) | Zone 12 | Pitch 12 |
| 0.857 per | 0.515 hertz | 26(t1+t2)=504.4 sec | 1/(t1m+t2m) | Zone 13 | Pitch 13 |
| 0.857 per | 0.515 hertz | 28(t1+t2)=543.2 sec | 1/(t1n+t2n) | Zone 14 | Pitch 14 |
| 0.857 per | 0.515 hertz | 30(t1+t2)=58.2 sec | 1/(t1o+t2o) | Zone 15 | Pitch 15 |
| 0.857 per | 0.515 hertz | 32(t1+t2)=620.8 sec | 1/(t1p+t2p) | Zone 16 | Pitch 16 |
| 0.857 per | 0.515 hertz | 34(t1+t2)=659.6 sec | 1/(t1q+t2q) | Zone 17 | Pitch 17 |
| 0.857 per | 0.515 hertz | 36(t1+t2)=698.4 sec | 1/(t1r+t2r) | Zone 18 | Pitch 18 |
| 0.857 per | 0.515 hertz | 38(t1+t2)=737.2 sec | 1/(t1s+t2s) | Zone 19 | Pitch 19 |
| 0.857 per | 0.515 hertz | 40(t1+t2)=768 sec | 1/(t1t+t2t) | Zone 20 | Pitch 20 |
| 0.857 per | 0.515 hertz | 42(t1+t2)=814.8 sec | 1/(t1u+t2u) | Zone 21 | Pitch 21 |
| 0.857 per | 0.515 hertz | 44(t1+t2)=853.6 sec | 1/(t1v+t2v) | Zone 22 | Pitch 22 |

*FIG. 7B*

FISHING LURE WITH RELAY CREATING IRREGULAR ELECTRIC SIGNALS

RELATED APPLICATIONS

This application is a continuation-in-part of U.S. patent application Ser. No. 09/500,939 filed Feb. 15, 2000, now abandoned, in the name of Freddie E. Jackson II, which is hereby incorporated in its entirety by reference herein.

BACKGROUND OF THE INVENTION

1. Technical Field of the Invention

This invention relates to fishing lures, and more particularly, to a fishing lure having a relay providing irregular sounds and visual signals for luring fish.

2. Description of Related Art

For countless years, fishermen have tried various devices for luring fish to a hook with the primary goal of catching the fish. Many hooks include colorful shapes and sizes of lures to attract the fish. It is commonly know that typical game fish have an inner ear enabling the fish to hear or sense sound transmitted through the water. Additionally, the fish have lateral line sensing organs which also can sense sound. It is equally well known fact that fish are attracted to specific sounds. Specifically, many fish are attracted to sounds/vibrations created by other aquatic creatures, especially those sounds attributed to creatures in distress. Naturally, most sounds created by aquatic creatures are not constant. In addition, many fish are attracted to lights, on the presumption that the light is light reflecting from the scales of another fish.

Although there are no known prior art teachings of a device such as that disclosed herein, prior art references that discuss subject matter that bears some relation to matters discussed herein are U.S. Pat. No. 4,805,339 to Fuentes et al. (Fuentes), U.S. Pat. No. 5,697,182 to Rodgers (Rodgers), and U.S. Pat. No. 6,047,492 to Watson et al. (Watson).

Fuentes discloses a sonic fishing lure having an energy source, an electrical circuit, and a sonic transducer container within chambers of a generally hollow cylindrically-shaped fishing lure. The sound output from a coil activator having a vibrating plate-type transducer is enhanced by an addition of a second vibrating plate. A fluid connection between the outer surface of the sound transducer and the body of the fishing lure further enhances and intensifies the sound output by the fishing lure. Although, Fuentes discloses a fishing lure which creates sounds for luring fish, Fuentes does not teach or suggest creating sounds at an irregular rate and volume, such as those created by aquatic creatures in distress. Additionally, the fluid connection disclosed in Fuentes suffers from the disadvantage of still requiring the sound to emanate through the outer shell of the lure, thereby deceasing the ability of the lure to efficiently transmit the sound to nearby fish.

Rodgers discloses a fishing lure having a battery connected to a timing circuit by a motion responsive switch. The timing circuit, responsive to an off-to-on transition of the motion responsive switch results in the timing of a power interval during which power is supplied over a timing circuit controlled connection from the battery to an output circuit. The timing circuit controls the timing connection. The output circuit is connected to receive power during the power interval and may supply power to a light-emitting diode, a speaker, or field effect probes. Although Rodgers discloses a fishing lure which may create sounds for luring fish, Rodgers does not teach or suggest a fishing lure creating irregular sounds for attracting fish. Rodgers merely discloses creating sounds at a steady rate and volume. In addition, Rodgers does not disclose a device for effectively transmitting the sounds through the water.

Watson discloses a fishing lure having a battery-powered oscillator circuit positioned within a water-resistant container module that is removably inserted into a selected body module that is balanced to insure proper lure action to recreate fish-attracting sounds and motions from the module. Watson does discloses a lure which creates sounds at a specified frequency. However, Watson does not teach or suggest a lure which creates sounds which are irregular. Additionally, Watson does not disclose any device for effectively transmitting and amplifying the sound to other fish.

Review of the foregoing references reveals no disclosure or suggestion of a fishing lure which provides a circuit which can create aural and visual signals for attracting fish at an irregular rate or volume. Additionally, there is no reference which discloses a device for effectively transmitting the created sound to the fish. It is an object of the present invention to provide such a device.

SUMMARY OF THE INVENTION

In one aspect, the present invention is a fishing lure for attracting fish located in water. The fishing lure includes a body having an outer surface, and circuitry for creating a plurality of irregular electric signals. The plurality of irregular electric signals are converted into a plurality of fish-attracting signals for attracting fish to the fishing lure. The attraction signals may be aural or visual signals.

In another aspect, the present invention is a fishing lure for attracting fish in water. The fishing lure includes a body having an outer surface. The outer surface has an indentation indented toward an interior chamber of the fishing lure. In addition, the fishing lure includes circuitry for generating a plurality of irregular electric signals. The circuitry converts the irregular electric signals into a plurality of fish-attracting signals for attracting fish to the fishing lure. The circuitry is protected from water flowing in the indentation by a single layer of water-impervious material. The circuitry is positioned within the interior chamber of the fishing lure and emits the attraction signals out through the indentation of the fishing lure.

BRIEF DESCRIPTION OF THE DRAWINGS

The invention will be better understood and its numerous objects and advantages will become more apparent to those skilled in the art by reference to the following drawings, in conjunction with the accompanying specification, in which:

FIG. 1 is a side view of a fishing lure in the preferred embodiment of the present invention;

FIG. 2 is a top view of the fishing lure of FIG. 1;

DETAILED DESCRIPTION OF EMBODIMENTS

Figure 3:
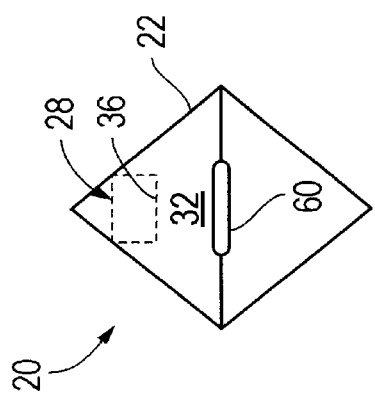
FIG. 3 is a front view of the fishing lure of FIG. 1.

A fishing lure having a circuit which creates an unsteady visual or aural signal is disclosed. FIG. 1 is a side view of a fishing lure 20 in the preferred embodiment of the present invention. The fishing lure includes a front section 22, a mid-body 24, and a tail section 26. The front section is preferably conically shaped. Additionally, the overall shape of the fishing lure is bullet-shaped to provide a better shape for traversing underwater. However, the fishing lure may be any size or shape allowing the placement of internal circuitry explained below. The mid-body includes an indentation 28 indented toward an interior portion of the fishing lure and providing an open space approximately mid-position on the mid-body. The fishing lure may optionally include a cavity 70 for holding weights in the front section. In addition, the mid-body may include one or more hollow chambers 72 for the accommodation of additional weights within the mid-body. The use of weights in fishing lures is well known to allow the fishing lure to sink downwardly into the water. The tail section may also include an opening 29 located within an interior portion 27 for the attachment of a hook to the fishing lure.

FIG. 2 is a top view of the fishing lure 20 of FIG. 1. The front section 22 may include a loop 30 affixed to an outer surface of the aft portion of the front section. A fishing line may be affixed to the loop.

FIG. 3 is a front view of the fishing lure 20 of FIG. 1. The indentation 28 is superimposed in FIG. 3. The indentation allows water, when the fishing lure is positioned within the water, to enter into an interior portion 32 of the fishing lure. At a bottom portion of the indentation is a surface layer 36. The surface layer is preferably a thin plastic or other water impervious material separating the interior circuitry of the fishing lure from the water. In this manner, when the fishing lure's circuitry creates sounds, the sounds are more efficiently transmitted from the fishing lure. Existing sonic fishing lures emanate sounds from the interior of the fishing lure through a hard plastic shell separated by a clearance between the fishing lure sound originator and the outer surface of the fishing lure, which results in the inefficient transmission of sounds.

Figure 4:
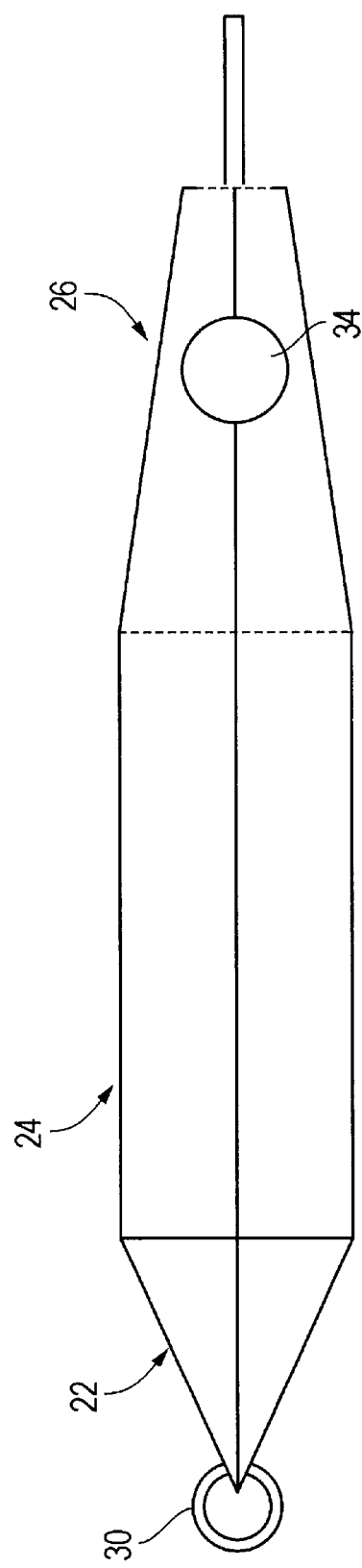
FIG. 4 illustrates a bottom view of the fishing lure of FIG. 1.

FIG. 4 illustrates a bottom view of the fishing lure of FIG. 1. The bottom portion of the fishing lure does not include any indentation, thus providing a solid continuous surface. The tail section may also include an opening 34 for allowing entry of water into the interior portion 27 of the tail section 26. In addition, in alternate embodiments of the present invention, the indentation 28 may be located anywhere on the surface of the fishing lure.

Figure 5:
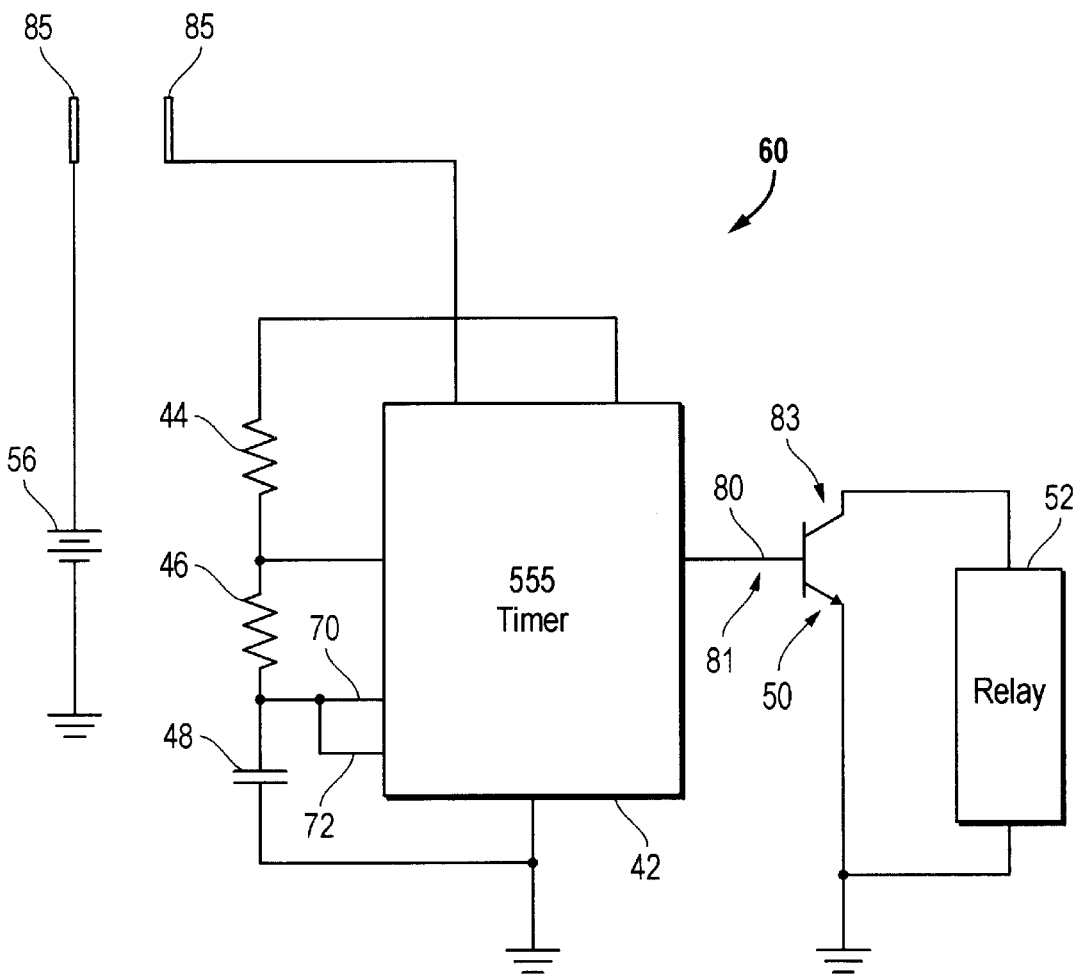
FIG. 5 is an electrical schematic diagram of a circuitry located in the interior chamber of fishing lure in the preferred embodiment of the present invention.

FIG. 5 is an electrical schematic diagram of a circuitry 40 located in the interior chamber 32 of fishing lure 20 in the preferred embodiment of the present invention. The circuitry includes an integrated circuit 60 having a timer 42, resistors 44 and 46, a capacitor 48, a transistor 50, a relay/transducer 52, and a power supply 56.

The timer 42 is a 555 timer which is configured as an astable multivibrator. Although a 555 timer is preferably used, any timer may be used, such as an astable timer. In operation, when power is first applied by power supply 56, which is preferably a direct current (DC) battery, the capacitor 48 is uncharged, which results in both a trigger input 70 and threshold input 72 having nearly zero volts. A lower comparator (not shown) located within the timer 42 sets the control flip-flop (not shown) of the timer causing the output of the timer to switch high, which in turn also turns off the transistor 50. The capacitor is then allowed to begin charging through resistors 44 and 46. As soon as the charge on the capacitor reaches ⅔ of the supply voltage, the upper comparator of the timer (not shown) triggers, causing the flip-flop to reset, thus causing the output to switch low and the transistor to conduct. With transistor 50 conducting, resistor 46 is then connected across the capacitor. The resistor 46 is effectively connected to ground through the transistor 50, which results in the capacitor discharging through resistor 46.

When the voltage across the capacitor reaches ⅓ of the supply voltage, the lower comparator is triggered, causing the control flip-flop to set and the output to go high. The transistor 50 then cuts off and the capacitor begins to charge. The cycle continues to repeat with the capacitor alternately charging and discharging, as the comparator induces the flip-flop to be repeatedly set and reset. The resulting output is a continuous stream of rectangular pulses.

The frequency of operation of the astable circuit is dependent upon the values of the resistors 44 and 46 and the capacitor 48. The time intervals for the on and off positions of the output depend on the values of resistors 44 and 46. Additionally, the duty cycle may be varied by changing the values of the resistors.

The timer 42 is used to generate digital pulses and drive the base of the transistor. By changing the resistors, the digital pulses created by the timer may be changed, which may result in different sounds.

The transistor 50 is used as a switch as well as an amplification device for amplifying the current that flows across a relay coil (not shown) of the relay 52. The timer output 80 is connected to the base of the transistor 50. The output square wave of the timer is used to drive a base 81 of the transistor. Each time the timer pulse is on the positive side, the relay's coil pulls in the contact and holds the contact until the pulse goes on the negative side. The coil then releases the contact, causing the contact to switch, resulting in the contact striking the metal plate that it rests on, thereby creating a sound. Thus, the transistor performs the function of a switch. In addition, each time the transistor connects the circuit and performs a complete loop causing current to flow, the transistor magnifies the current according to the voltage being applied from the battery.

The timer 42 drives the base of the transistor and induces the transistor 50 to switch on and off. When the transistor switches on, the transistor performs like a conventional switch. Each time the transistor receives a positive pulse, the transistor closes. In the alternative, when the transistor receives a negative pulse, the transistor opens. When the transistor's base receives a positive pulse, the current flows through the coil. In addition, the transistor amplifies the current according to the power supply's (battery) voltage that is being applied to complete the circuit. The timer only operates the switching portion of the transistor. A collector pin 83 of the transistor 50 is connected directly to the power supply 56. When the timer drives the base of the transistor, the transistor performs as a switch by creating a complete loop to apply the current through the coil. In turn, the transistor pulses into the contacts of the relay 52. When the transistor receives a negative pulse from the timer, the transistor performs as a switch and opens, thereby breaking the complete loop. Thus, the coil is de-energized and the current ceases to flow.

In summary, the circuitry 40 works as follows. The timer 42 generates rectangular pulses which are used to drive the base of the transistor 50. The transistor functions as a switch by closing up when a positive pulse is detected and opening when a negative pulse is detected. However, even though the timer is driving the base of the transistor, the collector pin of the transistor is connected to the power supply 56. Each time the timer sends a positive pulse to the base of the transistor, the transistor closes and current is allowed to flow through the coil of the relay. When the current begins to flow through the transistor, the transistor then begins to perform its secondary function of amplifying the current that it receives from the power supply. The amplified current flows through the coil. When the current starts to flow through the coil, the coil performs as an electromagnet while the pulse is on the positive side.

As is well known to those skilled in electrical circuits, the greater the current is allowed to flow through the coil, the stronger the magnetic field (flux density) becomes. The greater strength of the flux density of the coil enables the relay coil to pull the contact toward the magnetic field and into the strike plate (not shown). The strike plate is preferably a metal plate that the contact strike when pulled into the contact's final destination. This striking of the contacts on the metal plate creates a sound.

Figure 6:
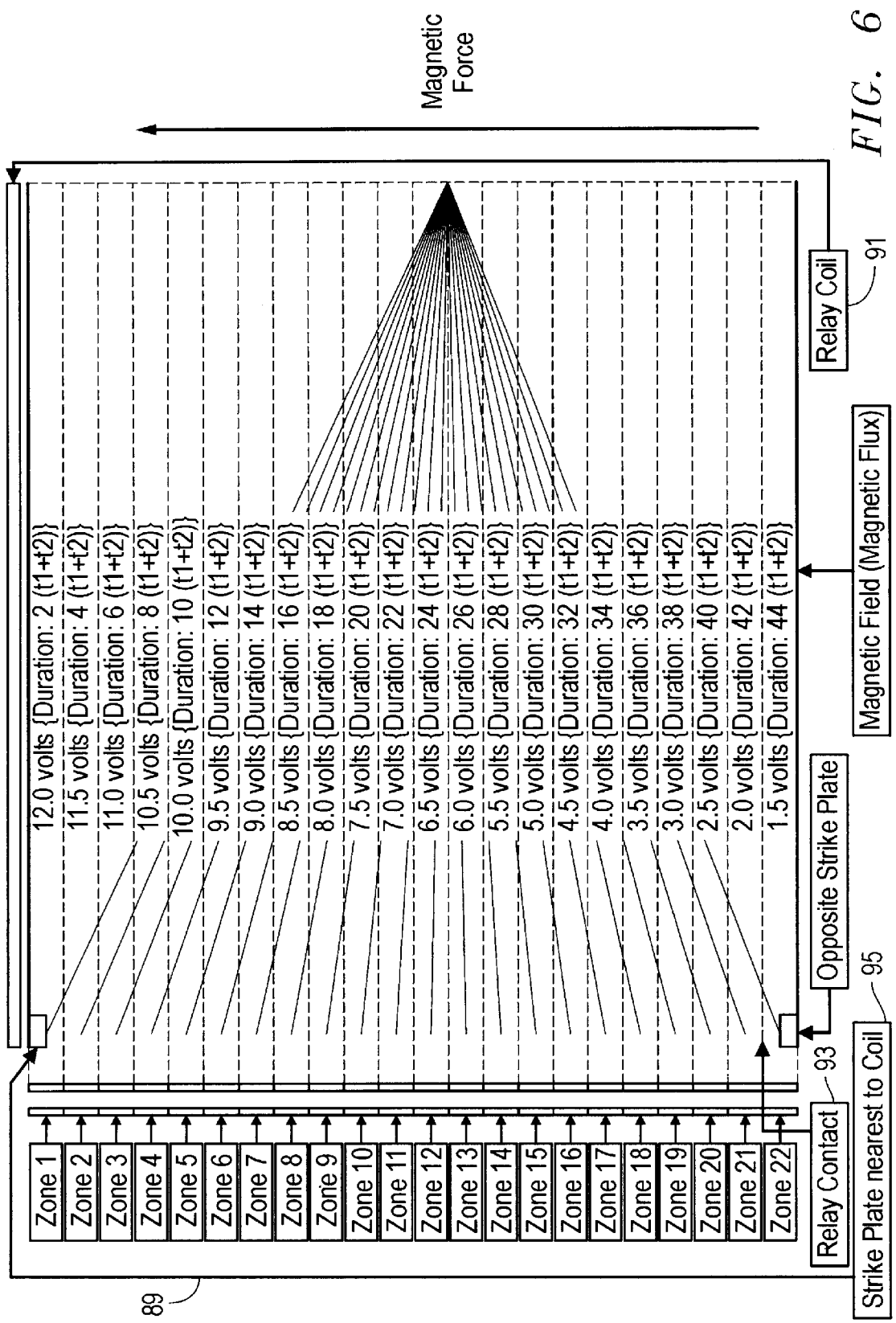
FIG. 6 is relay diagram of the relay illustrating how the relay functions during the casting of the fishing lure in the preferred embodiment of the present invention.

FIG. 6 is relay diagram of the relay 52 illustrating how the relay functions during the casting of the fishing lure 20 in the preferred embodiment of the present invention. Each zone 89 represents a different frequency for different sounds for a given fisherman's cast. Typically, the relay is energized and the magnetic field is produced by the relay coil 91 and in turn a relay contact 93 is drawn toward a strike plate 95 nearest the energized coil. If a normal current is utilized, when the relay is de-energized, the magnetic field's magnetic flux would normally decrease to zero, which would allow the contact to return to its original position (opposite strike plate) until the coil is re-energized again. However, in the preferred embodiment of the present invention, when the timer 42 turns on the transistor 50, the transistor receives current from the power source 56 and magnifies the current beyond the nominal current of the relay. The amplified current is then applied to the coil. When the coil is de-energized, the magnetic field continues to hold the contact near the energized coil, which enables the contact to move partially, rather than returning to its original position.

Specifically, when the timer 42 sends the transistor 50 a negative pulse, the transistor opens and current ceases to flow. However, even though the current is no longer flowing, the relay coil's magnetic field (flux density) is still great. This residual magnetic field occurs because the transistor amplifies the current at a higher level than the relay's nominal coil current. When the current is amplified, the relay coil's magnetic field gets stronger than normal through this current amplification. Thus, the coil does not allow the contact to be released during the time period that is typically allocated for the contact to be released (e.g., during the off pulse or negative pulse time).

As discussed above, the resistors 44 and 46 and capacitor 48 can be varied, which may result in creating different sounds. Additionally, the complete time that it takes the pulse to go from the positive side to the negative side is called the duty cycle.

The amplification of the current enables the magnetic field of the relay's coil to become stronger and stronger, which causes the coil to continue to hold the contact, even with the current turned off. This is caused by the fact that an adequate amount of time is not given for the magnetic flux of the coil to die out. This situation is called dropout. Dropout is defined as when the coil of the relay is de-energized and the magnetic flux does not die out immediately, causing the coil to hold the contact during this "off" time period.

Each time the timer 42 initiates a complete duty cycle, the transistor amplifies the current through the coil, causing the magnetic field of the coil to hold the contact, even though the negative pulse opens the transistor 50 and current ceases to flow. During the process of the coil being energized with the amplified current and de-energized for the shorter period of time, the power supply 56 (battery) starts to drain the amplified current that is being applied to the relay coil, resulting in a decreased magnetic field of the coil. When the negative pulse is generated by the timer, the current ceases to flow and the magnetic field is decreased, as compared to the beginning of the cycle. This weakened magnetic field results in the contact being released for a period of time, resulting in the contact to level the strike plate (where it was forced to stay when the magnetic field was at its peak). However, at this point, the magnetic field is still strong enough not to allow the contact to totally switch to the opposite strike plate, thus allowing the magnetic field to draw the contact back to the strike plate to produce a sound.

The process of the power supply weakening continues, which results in the contact going an incrementally smaller distance further toward the opposite strike plate during the off time than the prior period of time. However, at this point, the magnetic field is still strong enough to pull the contact back with a great, although weaker force, thus creating a different sound which may be a different pitch and or decibel level. These varying sounds attract fish toward the fishing lure 20.

During the time the power supply 56 is draining, the amplified current also incrementally decreases. Thus, the magnetic field is also incrementally weakened, causing the contact to move further toward the opposite strike place, which results in a different sound. This entire process is continued until the fishing lure is retrieved from the water and the power supply is allowed to recharge itself.

Figure 7:
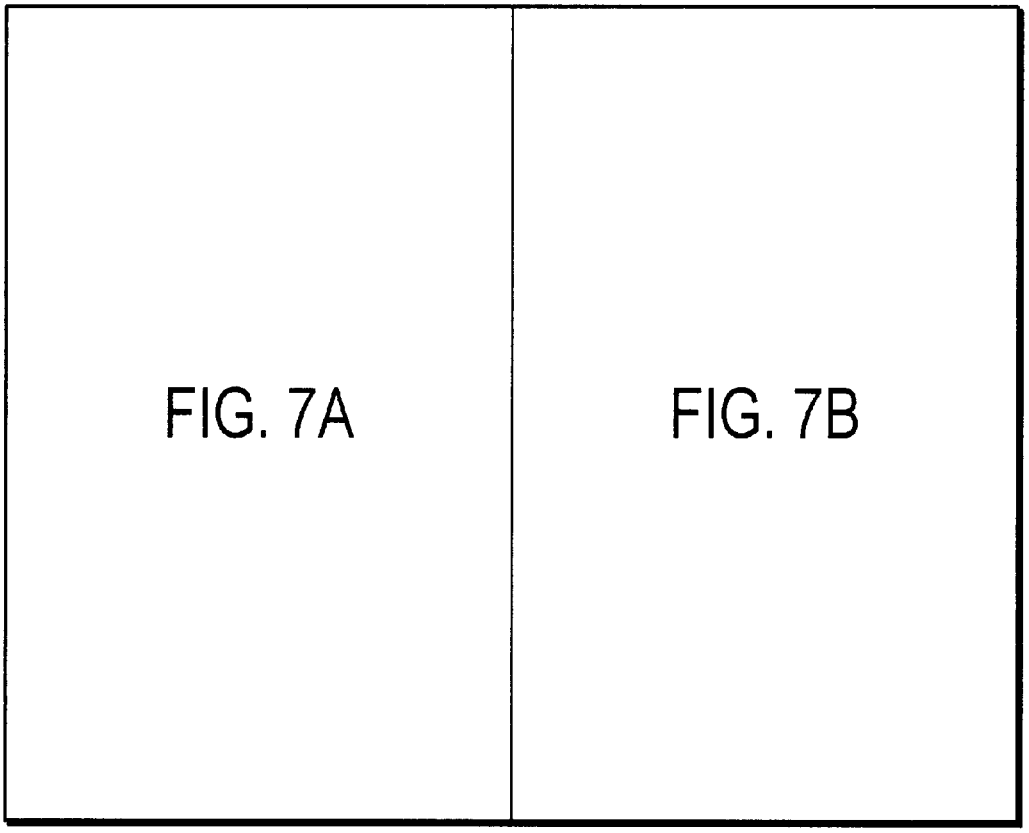
FIG. 7 illustrates the incremental decrease in current and the resultant creation of different sounds in the preferred embodiment of the present invention.

FIG. 7 illustrates the incremental decrease in current and the resultant creation of different sounds in the preferred embodiment of the present invention. FIG. 7 is merely exemplary and it should be understood that different voltages, resistance, and currents may be used and still function in the same manner. Referencing FIGS. 6 and 7, the zones represent how far the magnetic field allows the contact 93 to be released while the coil is de-energized with respect to the power supply 56's voltage. When the power supply voltage decreases, the current also decreases, which causes the magnetic field's flux to weaken. This variance in the positioning of the contact may produce a different frequency each time the power supply weakens. When the power supply weakens, the contact of the relay is allowed to travel further toward its original position, which increases the travel time (t1 and t2) and changes the frequency to produce a different pitch.

Referencing FIG. 7, column A represents the voltage of the power source 56 (battery). Column B represents the voltage received to turn the transistor 50 on each time the timer 42 sends a positive pulse to the base of the transistor. Column C represents the relay's coil resistance. Column D represents the amplified current. Column E represents the positive side (t1) of the square wave in seconds that is received by the base of the transistor each time the timer initiates a complete cycle. Column F represents the negative side (t2) of the square wave in seconds that is received by the base of the transistor each time the timer initiates a complete cycle. Column G represents the complete duty cycle (both the positive and negative side of the square) which is given when both the positive and negative portion of the square wave is completed. Column H represents the frequency of the timer. Column I represents the duration in time that the contact spends in each zone. Column J represents the frequency of the relay in each given zone. The different frequencies are calculated by adding the time it takes the contact to go from any given zone back to the strike plate that is closest to the relay coil. After both t1 and t2 are confirmed, the times are added together to compute the total time it takes the contact to make a complete trip from any given zone back to the strike plate nearest the coil. After this has been determined, the reciprocal of the sum is calculated to determine the frequency of each zone. Each time the power source weakens, the magnetic flux weakens which allows the contact to travel to a different zone. Column K denotes each different zone. Column L denotes each different pitch.

After the cast is completed, the fishing lure 20 is retrieved from the water. A plurality of electrodes 85 located on a board 87 holding the circuitry 40 within the interior of the fishing lure's body, are used to complete the circuit when the fishing lure is cast into the water. However, when the fishing lure is removed from the water, the electrodes disconnect the circuitry 40 from the power supply 56, thus allowing the power supply (battery) to start a recharging process. In a conventional battery, in approximately three to four seconds, the battery is back to its original voltage (e.g., 12 volts). At this time, the fishing lure may be cast back into the water. Thus, each time the fisherman casts the fishing lure into the water for a period of time, the fishing lure emits varying sounds.

Figure 8:
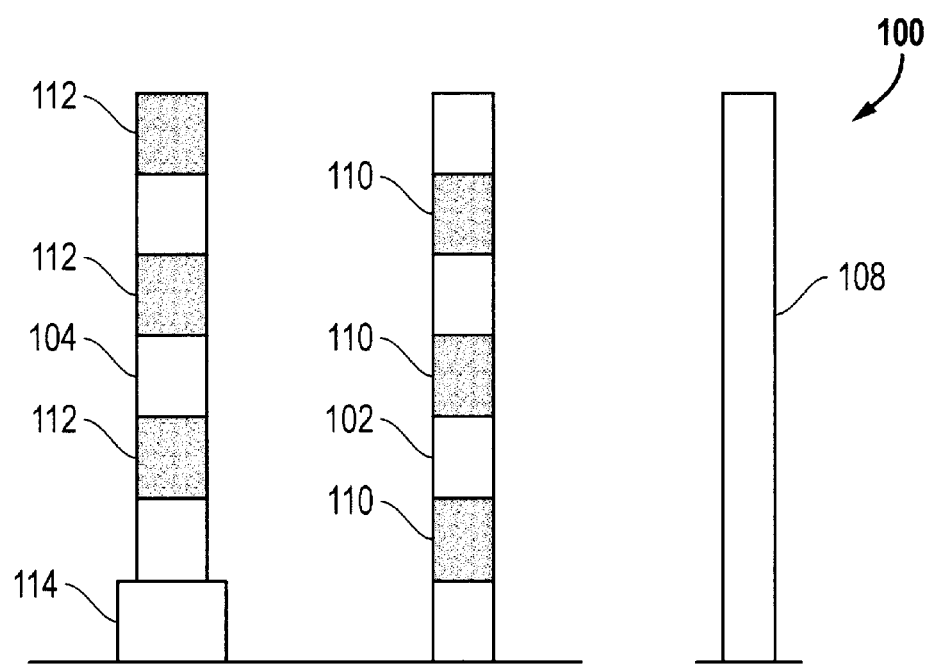
FIG. 8 illustrates a side view of the separated components of a visual signaling device in an alternate embodiment of the present invention.
Figure 9A:
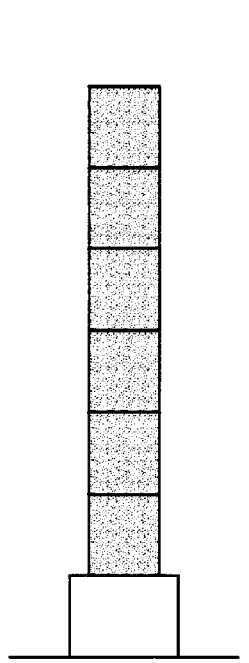
FIG. 9A illustrates the inner cylinder positioned within the outer cylinder in the closed position.
Figure 9B:
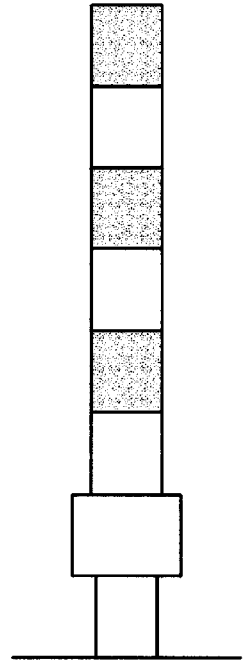
FIG. 9B illustrates the inner cylinder positioned within the outer cylinder in the open position revealing the glow stick.

The circuitry 40 may also be utilized to power other signaling devices, such as visual light emitters and propeller-type devices. FIG. 8 illustrates a side view of the separated components of a visual signaling device 100 in an alternate embodiment of the present invention. The signaling device includes a stationary inner cylinder 102 surrounding a glow stick 108. Additionally, an outer cylinder 104, slightly larger than cylinder 102 is positioned over the cylinder 102. The inner cylinder has shutters 110 which are similar to shutters located on window. The outer cylinder 104 also has shutters 112 which are preferably offset from the shutters 110. The outer cylinder has a magnet 114 positioned at a bottom end of the cylinder. The shutters 112 are also moveable and preferably slide laterally with respect with the stationary cylinder 102. The shutters 110 and 112 are offset from each other so that when shutters 112 are at complete rest (fully down), the shutters 110 are hidden by shutters 112. When shutters 112 are fully up, the shutters 110 are visible outwardly. With the shutters 110 visible, the glow stick illuminates through cutouts formed by the shutters 110. FIG. 9A illustrates the inner cylinder positioned within the outer cylinder in the closed position. As illustrated, the glow stick is not seen. FIG. 9B illustrates the inner cylinder positioned within the outer cylinder in the open position revealing the glow stick.

With respect to the operation of the visual signaling device, when the coil of the relay 52 is energized, the created magnetic field causes the magnet 114 to push away from an external coil's (not shown) magnetic field, thus pushing the shutters 112 upwardly and exposing the cutouts of the shutters 110 and the underlying glow stick 108.

When the relay 52 opens and closes depending on the nominal voltage of the relay, the shutters 112 also open and close, thus causing a blinking effect, which may attract fish to the fishing lure 20.

Figure 10:
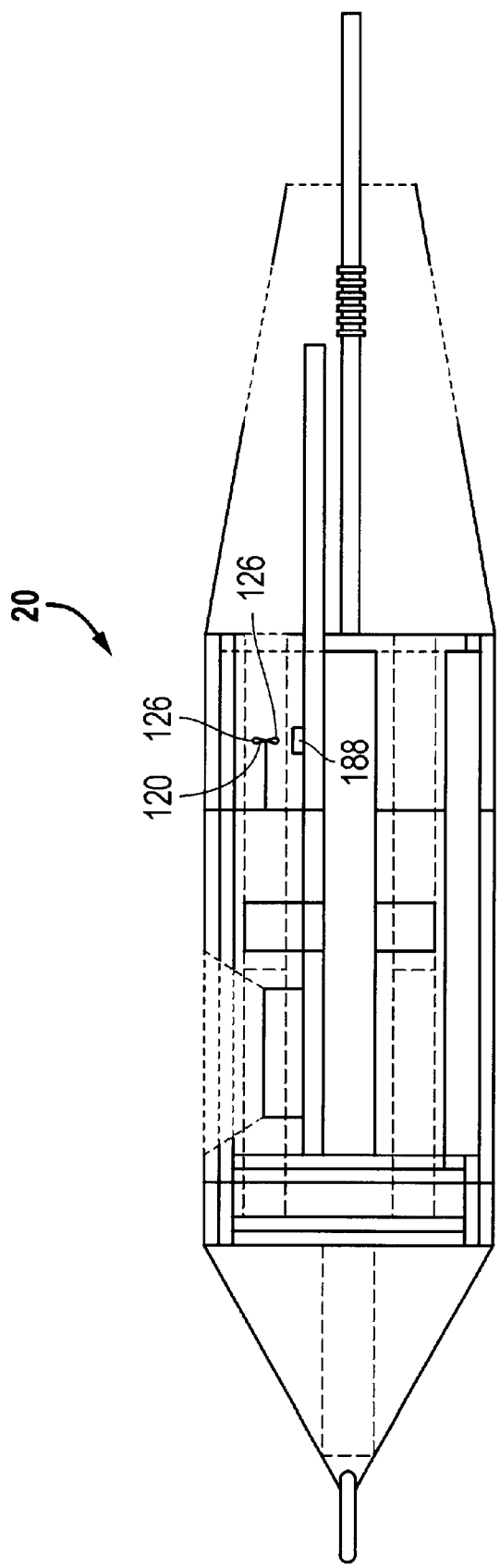
FIG. 10 is a front perspective view illustrating the fishing lure with a propeller in an alternate embodiment of the present invention.

FIG. 10 is a front perspective view illustrating the fishing lure 20 with a propeller 120 in an alternate embodiment of the present invention. In this alternate embodiment of the present invention, the fishing lure may be equipped with the propeller 120 having a capability of rotating within an inner portion of the fishing lure 20. As illustrated in FIG. 10, the fishing lure includes an interior portion 122 where the propeller is position. An opening 124 allows water to enter into the interior portion. The propeller is preferably a two-bladed propeller positioned within the cylinder. At each end of the propeller is a permanent magnet 126. One of the magnet 126 has the same pole setting as the magnetic field created by the relay 52's coil while the other magnet 126 on the opposite end of the propeller has a different pole setting as the magnetic field of the coil. Thus, one blade of the propeller includes the magnet with a different pole setting than an electromagnet of an additional external coil 188, while the other blade includes a magnet with the same pole as the electromagnet. As the propeller rotates, it propels the fishing lure through the water.

Still referring to FIG. 10, the operation of the fishing lure 20 having the propeller 120 will now be explained. When the coil of the relay 52 is energized, a magnetic field is produced. One of the magnet 126 has the same pole setting as the coil, which allows the magnet 126 to be pushed away from the coil (180 degrees). After pushing the propeller 180 degrees, the timer 42 produces a negative pulse which turns off the relay and de-energizes the external coil. When the external coil is de-energized, the magnetic field falls out. The propeller continues to rotated by the momentum of the rotating propeller. When the timer reproduces another positive pulse, the propeller is pushed an additional 180 degrees. Thus, during the on and off cycle of the fishing lure, the fishing lure provides a movement of the fishing lure by the rotation of the propeller, which may result in the attraction of fish.

Although the fishing lure utilizes the circuitry 40 discussed above, any circuitry allowing the variance of sound or visual signals may be used. By varying the sound and visual signals from the fishing lure, fish are more likely to be attracted to the fishing lure. Additionally, although the circuitry is preferably located within an interior chamber of the fishing lure, the circuitry may be located anywhere where the circuitry can efficiently transmit sounds and visual signals to other fish. Additionally, although the fishing lure may utilize a shutter system to create blinking lights, any method may be used which provides an irregular light pattern.

The fishing lure 20 provides many advantages over existing fishing lures. Although there are fishing lures which emit sounds, there are no devices which emit irregular sounds, which provides a more realistic simulation of an aquatic creature in distress. Additionally, the fishing lure may be used to create visual signals, as well as movement of the fishing lure, to attract the fish. The fishing lure also provides an effective method of emanating the sound through the water by allowing the circuitry 40 to be located adjacent the water, rather than separated by an outer shell of the fishing lure.

It is thus believed that the operation and construction of the present invention will be apparent from the foregoing description. While the apparatus shown and described has been characterized as being preferred, it will be readily apparent that various changes and modifications could be made therein without departing from the scope of the invention as defined in the following claims.

What is claimed is:

1. A fishing lure for attracting fish located in water, the fishing lure comprising:

a body having an outer surface;

said body having a means for automatically creating a plurality of irregular electric signals; and said body having a means for converting the plurality of irregular electric signals into a plurality of fish-attracting signals for attracting fish to the fishing lure.

2. The fishing lure of claim 1, wherein said body includes an inner chamber located in an interior portion of said body for housing said means for creating a plurality of irregular electric signals.

3. The fishing lure of claim 1, wherein said means for automatically creating a plurality of irregular electric signals is a circuit having a power supply providing electric power at a steadily decreasing voltage.

4. The fishing lure of claim 3, wherein the circuit includes:

a relay receiving electric power from the power supply, said relay converting the electric power into a magnetic field;

a timer for periodically energizing said relay;

whereby the magnetic field is converted into an aural signal.

5. The fishing lure of claim 4, wherein the aural signal is created by pulling a contact attracted by the magnetic field toward a strike plate.

6. The fishing lure of claim 4, wherein said relay receives a voltage greater than a required nominal voltage, whereby the relay generates the magnetic field at a varying rate based on the decreasing voltage received by the power supply.

7. The fishing lure of claim 1, wherein said means for converting the plurality of irregular electric signals into fish-attracting signals for attracting fish to the fishing lure include transducer means for converting the plurality of irregular electric signals into sound.

8. The fishing lure of claim 1, further comprising a means for efficiently transmitting the plurality of fish-attracting signals through the water within said body.

9. The fishing lure of claim 8, wherein said means for efficiently transmitting the irregular electric signals includes positioning said means for converting the plurality of irregular electric signals into a plurality of fish-attracting signals adjacent the water, said converting means being protected from the water by a single layer of water-impervious material.

10. The fishing lure of claim 9, wherein said body includes an indentation, whereby the water flows close to an interior portion of the fishing lure where said converting means is positioned.

11. A fishing lure for attracting fish in water, the fishing lure comprising:

a body having an outer surface, the outer surface having an indentation indented toward an interior chamber of the fishing lure;

circuitry for automatically generating a plurality of irregular electric signals;

said circuitry converting said irregular electric signals into a plurality of fish-attracting signals for attracting fish to the fishing lure, said circuitry protected from water flowing in the indentation by a single layer of water-impervious material;

whereby said circuitry is positioned within the interior chamber of the fishing lure and emits the plurality of fish-attracting signals out through the indentation of the fishing lure.

12. The fishing lure of claim 11, wherein said plurality of fish-attracting signals are sounds generated by said circuitry.

* * * * *